United States Patent
Laursen et al.

(10) Patent No.: US 6,233,608 B1
(45) Date of Patent: *May 15, 2001

(54) METHOD AND SYSTEM FOR SECURELY INTERACTING WITH MANAGED DATA FROM MULTIPLE DEVICES

(75) Inventors: Andrew L. Laursen, San Mateo; Bruce K. Martin, Jr.; Alain S. Rossmann, both of Palo Alto, all of CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/320,296

(22) Filed: Jun. 7, 1999

Related U.S. Application Data

(63) Continuation of application No. 08/987,346, filed on Dec. 9, 1997, now Pat. No. 6,065,120.

(51) Int. Cl.$^7$ .................................................. G06F 17/30
(52) U.S. Cl. .............................. 709/217; 707/10; 713/201
(58) Field of Search .............................. 713/2, 201, 200; 709/203, 214, 217, 227, 218, 219, 10; 455/550, 556, 557

(56) References Cited

U.S. PATENT DOCUMENTS

| | | |
|---|---|---|
| 5,321,840 | 6/1994 | Ahlin et al. . |
| 5,434,918 | 7/1995 | Kung et al. ............................ 380/25 |
| 5,610,910 | * 3/1997 | Focsaneanu ........................... 370/351 |
| 5,673,322 | 9/1997 | Pepe et al. . |
| 5,689,642 | 11/1997 | Harkins et al. . |
| 5,689,825 | 11/1997 | Averbuch et al. . |
| 5,703,942 | 12/1997 | Pinard et al. . |
| 5,708,780 | 1/1998 | Levergood et al. .................. 709/229 |
| 5,717,923 | 2/1998 | Dedrick . |

(List continued on next page.)

OTHER PUBLICATIONS

Jouni Mikkonen, Matti Turunen, "An Integrated QoS Architecture for GSM Networks", Nokia Wireless Data Library, sqosarchit.pdf, (PDF file, size 72 KB), Oct. 1997.*

Bartlett, Joel F., Digital WRL Technical Note TN–46, "Experience with a Wireless World Wide Web Client," Mar. 1995, pp. 1–7.

Gessler et al., Computer Networks & ISDN Systems, "PDAs as mobile WWW browsers," vol. 28, #1–2, 1995, pp. 53–59.

*Primary Examiner*—Thomas M. Heckler
(74) *Attorney, Agent, or Firm*—Beyer Weaver & Thomas, LLP

(57) ABSTRACT

The present invention has been made in consideration of thin devices efficiently communicating ideas and transactions into data networks by using other devices with fill functional user interface in the networks. According to one aspect of the present invention, the thin device exclusively controls the authentication of a rendezvous that is associated with a user account in a server. The thin device running a microbrowser provisions the rendezvous with a set of credential information in an authenticated and secure communication session so that the provisioning process is truly proprietary. To access the user account, the other devices equipped with well known browsers must submit the correct credential information to the rendezvous for verification in the server. Once admitted, the other devices can update managed information in the user account, individually and respectively, thereby the thin device is able to conduct desired transactions based on the managed information in the user account without the need to key in pertinent information of the transactions.

50 Claims, 12 Drawing Sheets

Microfiche Appendix Included
(2 Microfiche, 195 Pages)

U.S. PATENT DOCUMENTS

| | | | |
|---|---|---|---|
| 5,721,827 | | 2/1998 | Logan et al. . |
| 5,727,159 | | 3/1998 | Kikinis . |
| 5,732,074 | * | 3/1998 | Spaur ................................. 370/313 |
| 5,740,430 | | 4/1998 | Rosenberg et al. . |
| 5,742,905 | | 4/1998 | Pepe et al. . |
| 5,754,939 | | 5/1998 | Herz et al. . |
| 5,764,235 | | 6/1998 | Hunt et al. . |
| 5,796,832 | | 8/1998 | Kawan . |
| 5,802,276 | * | 9/1998 | Benantar ............................ 395/186 |
| 5,805,159 | | 9/1998 | Bertram et al. ..................... 707/507 |
| 5,805,803 | | 9/1998 | Birrell et al. ....................... 713/201 |
| 5,809,415 | | 9/1998 | Rossmann . |
| 5,815,665 | | 9/1998 | Teper et al. ......................... 709/229 |
| 5,825,759 | | 10/1998 | Liu . |
| 5,828,833 | | 10/1998 | Belville et al. ..................... 713/201 |
| 5,835,577 | * | 11/1998 | Disanto ............................ 379/93.19 |
| 5,838,682 | | 11/1998 | Dekelbaum et al. ............... 370/401 |
| 5,844,972 | | 12/1998 | Jagadish et al. . |
| 5,848,161 | | 12/1998 | Luneau et al. ........................ 380/49 |
| 5,857,201 | | 1/1999 | Wright, Jr. et al. ................. 707/104 |
| 5,862,325 | | 1/1999 | Reed et al. . |
| 5,862,330 | * | 1/1999 | Anupam ........................ 395/200.34 |
| 5,862,339 | | 1/1999 | Bonnaure et al. .................. 709/227 |
| 5,867,153 | | 2/1999 | Grandcolas et al. . |
| 5,867,661 | | 2/1999 | Bittinger et al. . |
| 5,884,312 | | 3/1999 | Dustan et al. ........................ 707/10 |
| 5,887,171 | | 3/1999 | Tada et al. ........................... 709/303 |
| 5,890,155 | * | 3/1999 | Steinman ................................. 707/9 |
| 5,896,444 | | 4/1999 | Perlman et al. ................. 379/93.35 |
| 5,901,287 | | 5/1999 | Bull et al. . |
| 5,903,845 | | 5/1999 | Buhrmann et al. . |
| 5,905,251 | | 5/1999 | Knowles ......................... 235/472.01 |
| 5,907,547 | | 5/1999 | Foladare et al. ..................... 370/352 |
| 5,918,019 | | 6/1999 | Valencia .............................. 709/227 |
| 5,923,756 | | 7/1999 | Shambroom .......................... 380/21 |
| 5,926,624 | | 7/1999 | Katz et al. ........................... 705/707 |
| 5,926,636 | | 7/1999 | Lam et al. ........................... 709/303 |
| 5,954,799 | * | 9/1999 | Goheen ............................... 709/250 |

OTHER PUBLICATIONS

Kaashock et al., Proceedings of the IEEE Workshop on Mobile Computing Systems and Applications, "Dynamic Documents: Mobile Wireless Access to the WWW," Dec. 1994, pp. 1–6.

Kaashock et al., Proceedings of the IEEE Workshop on Mobile Computing Systems and Applications, "Dynamic Documents: Extensibility and Adaptability in the WWW," Dec. 1994, pp. 1–10.

Liljeberg et al., SDNE, "Optimizing World–Wide Web for Weakly Connected Mobile Workstations: An Indirect Approach," Jun. 5–6, 1995, pp. 1–8.

Schilit et al., Proceedings of the IEEE Workshop on Mobile Computing Systems and Applications, Context–Aware Computing Applications, Dec. 1994, pp. 1–7.

Schilit et al., Fifth International World Wide Web Conference, "TeleWeb: Loosely Connected Access to the World Wide Web," May 6–10, 1996, pp. 1–14.

Voelker et al., Proceedings of the IEEE Workshop on Mobile Computing Systems and Applications, "Mobisaic: An Information System for a Mobile Wireless Computing Environment," Dec. 1994, pp. 53–59.

* cited by examiner

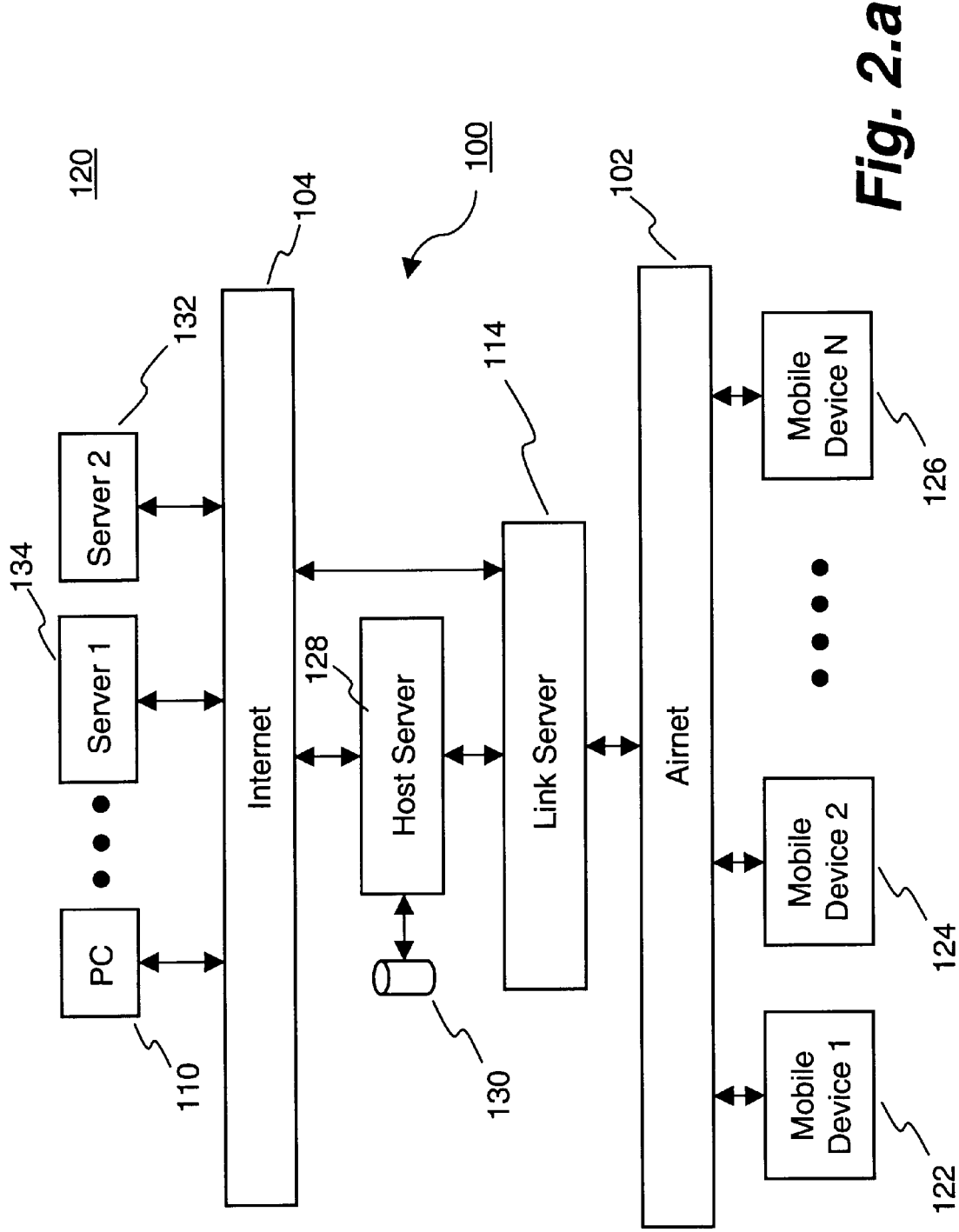
Fig. 2.a

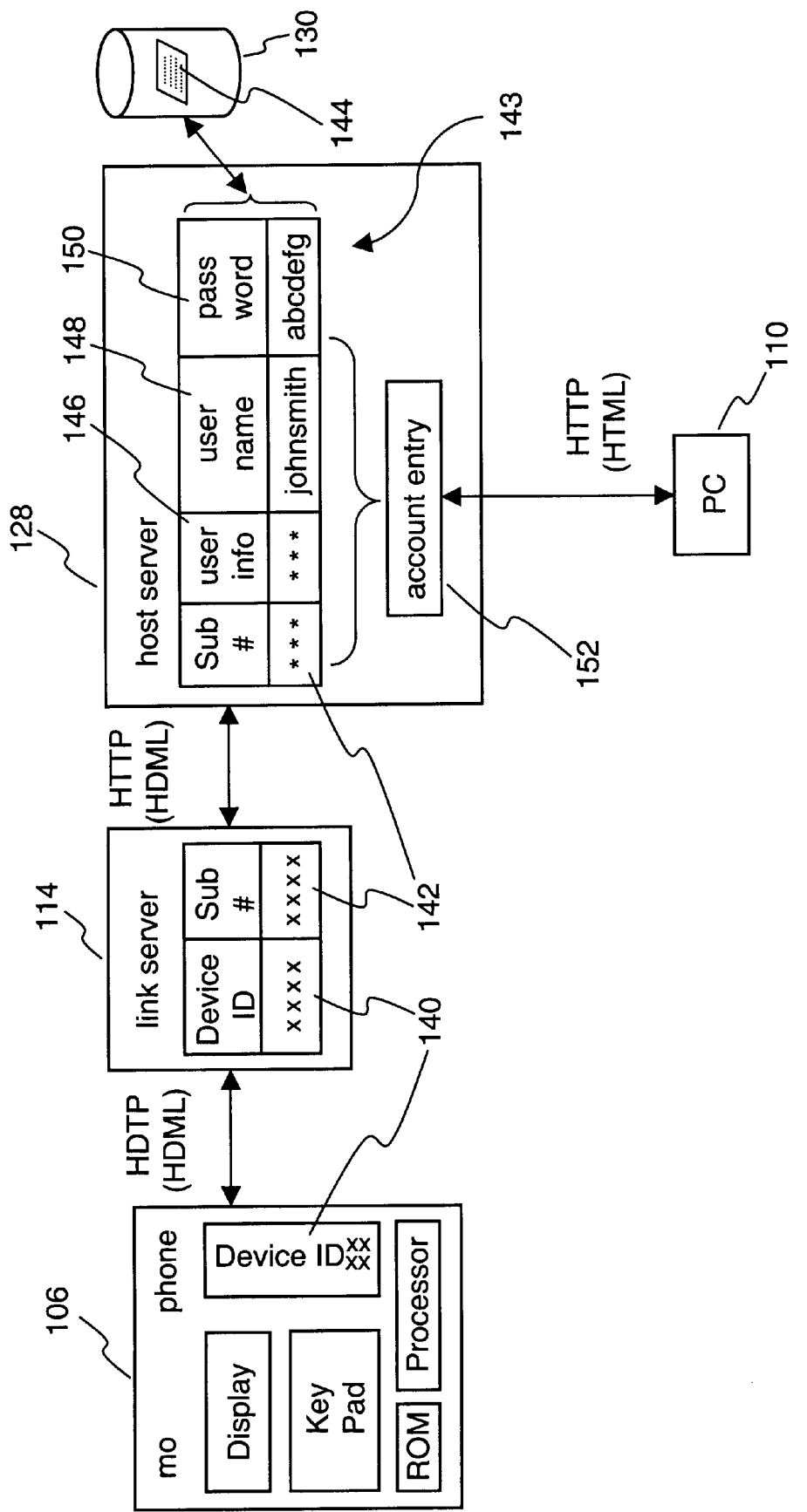
Fig. 2.b

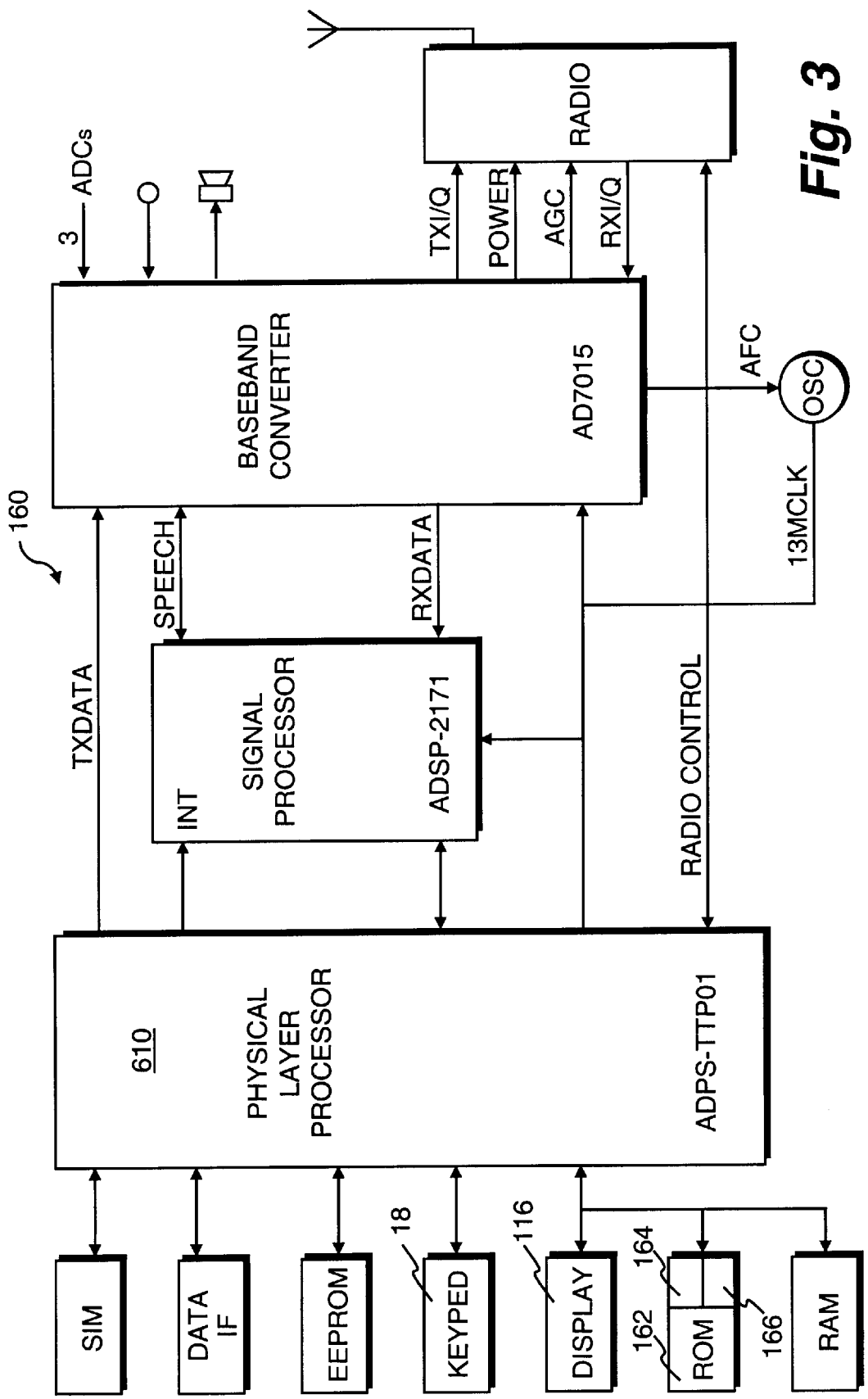

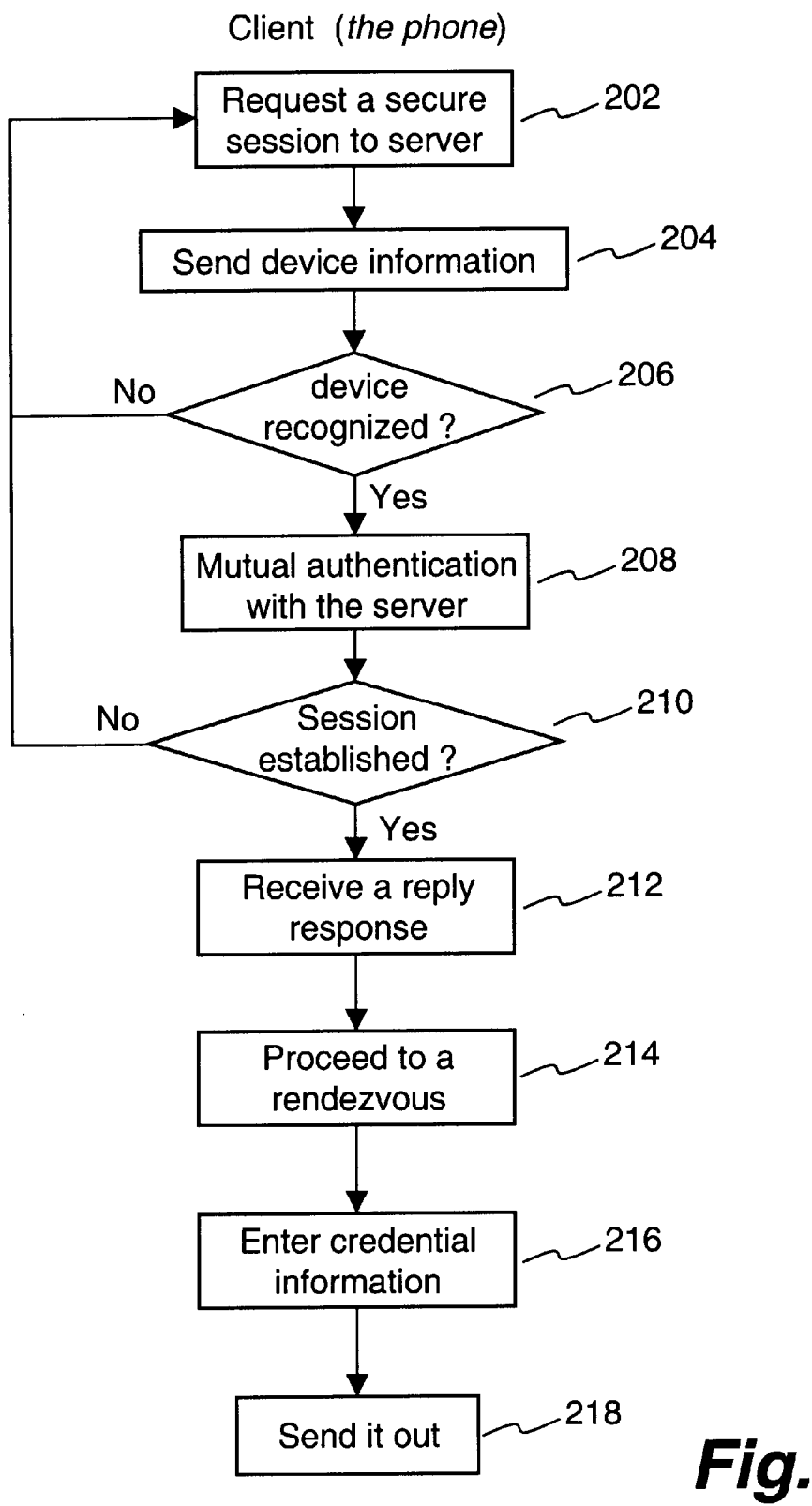
Fig. 5.a

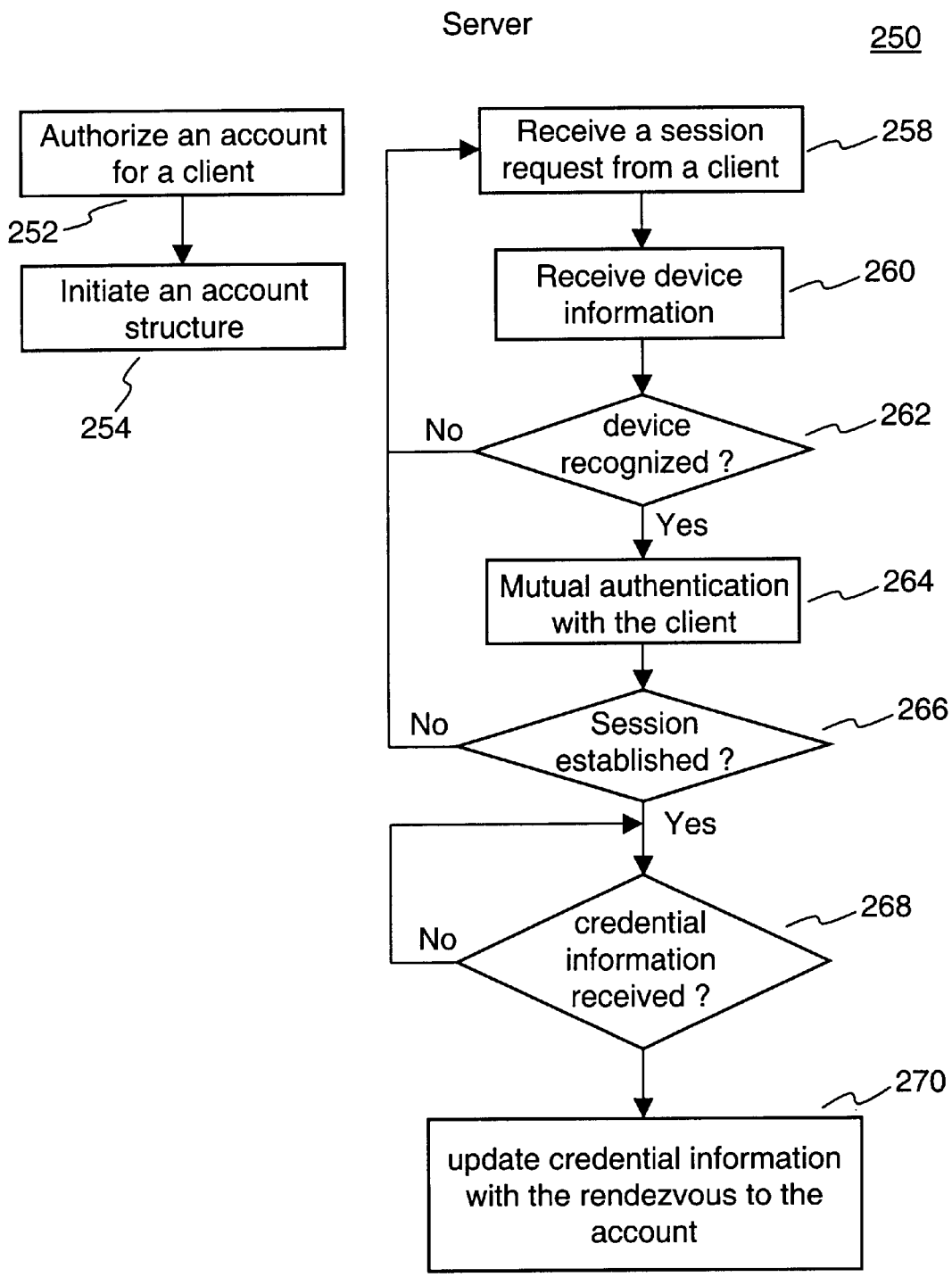
Fig. 5.b

METHOD AND SYSTEM FOR SECURELY INTERACTING WITH MANAGED DATA FROM MULTIPLE DEVICES

CROSS REFERENCE TO RELATED APPLICATIONS

This application claims the benefit of U.S. Application No. 08/987,346, filed Dec. 9, 1997, now U.S. Patent No 6,065,120, the content of which is hereby incorporated by reference.

REFERENCE TO APPENDIXES

Appendix A, which is a part of the present disclosure, is a microfiche appendix consisting of 2 sheets of microfiche having a total of 195 frames. The microfiche Appendix is a source code listing of one embodiment of the authentication and provisioning process in the present invention, which is described more completely below.

A portion of the disclosure of this patent document contains material, that includes, but is not limited to, Appendix A and Appendix B, which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of Invention

The invention relates to user authentication systems over data network systems, and more particularly relates to a method and system for self-provisioning, through a first device, a rendezvous to ensure secure access to managed information in a user account by other devices through the rendezvous in a data network, wherein the rendezvous is generally identified by a URL, the first device, coupled to the data network, runs a first browser under a first communication protocol and the other devices in the same data network run a second browser under a second communication protocol.

2. Description of the Related Art

The Internet is a rapidly growing communication network of interconnected computers around the world. Together, these millions of connected computers form a vast repository of hyperlinked information that is readily accessible by any of the connected computers from anywhere and anytime. To provide mobility and portability of the Internet, wireless computing devices were introduced and are capable of communicating, via wireless data networks, with the computers on the Internet. With the wireless data networks, people, as they travel or move about, are able to perform, through the wireless computing devices, exactly the same tasks they could do with computers on the Internet The most common remote access paradigm is, as of today, the one in which a laptop personal computer is equipped with a wireless communication mechanism, for example, a wireless modem. This paradigm may remain useful for a considerable number of applications and users, but there has been a growing need for a mobile paradigm in which the Internet can be instantly accessed by mobile devices, such as cellular phones and personal digital assistants. The mobile devices are generally designed small in size and light in weight. With increasing data processing capabilities in the mobile devices, more and more users start carrying the devices around to materialize their unproductive time into productive time. As more commonly seen, regular mobile phones can return calls, check voice mail or make users thereof available for teleconferences anywhere and anytime, but desired mobile phones, not just reactive to calls but also proactive, can meld voice, data, and personal information with manager-like functionality into a single handset that can effectively, through a host computer, access a myriad of public and enterprise information services in the Internet.

The evolution of the mobile phones or the mobile devices has been fueled by the demand of users for immediate access to the information they are looking for. For example, a traveler may request an exact flight schedule when he is on his way to airport, or a trader may purchase shares of stock at a certain price. The pertinent information from these ideas or transactions may include the airline and the flight number for the traveler as well as the number of shares and the price thereof being purchased by the trader. To be timely informed, a preferable way is to communicate the information requests electronically into the wireless data network. The data network, for example, connects to a flight information server or stock quote server so that the desired flight information or the current stock price can be retrieved therefrom on demand. However, it becomes troublesome or impractical to key in lengthy information queries electronically into the data network through a mobile device that typically has a keypad with a few buttons, much less functional compared to a keyboard in a personal computer system. There is therefore a great need for a method and system for efficiently communicating desired transactions into a data network through which the transaction can be performed or pertinent information can be retrieved without the need to key in such every time the transactions or the information are desired. In many cases the desired information in a user account, especially regarding personal matters, is preferred to be confidential. Thus there is further a need for a generic solution that provides a method and means for self-provisioning an account entry to a user account that has the proprietary information therein accessible only through the account entry.

SUMMARY OF THE INVENTION

The present invention has been made in consideration of the above described problems and has particular applications to systems of self-authentication by authorized users using devices that have limited computing power. Cellular phones are the typical example that has very little computing power and memory to satisfy the power long lasting and portability requirement, others include Internet-enabled electronic appliances that generally have computing powers at a minimum so as to reduce the cost thereof for market popularity. All these devices, considered as thin devices or clients herein, in data networks, provide users with portable, convenient, and instant access to information being sought in the Internet; for example, retrieving a list of stock quotes using a mobile phone or viewing a list of interested news stations on Internet-connected TVs. In both examples, the mobile phone and a remote control of the TV have very limited user interface to receive inputs from users. One of the important aspects of the present invention is to provide a generic solution for communicating desired ideas or transactions from other devices with rich user interface to such a thin client through a self-provisioned account entry.

While administrated user authentication systems over data networks have been used extensively in areas such as administered network computers and electronic commerce in the Internet, the present invention disclosing a method and system for self-provisioning, through a first device, e.g. the cellular phone or the remote control, a rendezvous to ensure secure access to a user account by other devices through the rendezvous yields unexpected results. The administrated user authentication systems in computer networks generally require each account holder to remember his username and associated password. If the username and password were ever lost or forgotten, the corresponding account becomes abandoned or must be clarified by a system administer. The disclosed invention, however, allows a user to self-provision an account entry or a rendezvous with a set of credential information, which does not require the user to write down or remember the credential information in order to access his account. Further, the user is the only one who knows the credential information created in an authenticated and secure communication session for the rendezvous, thereby the account becomes truly proprietary. Moreover through the rendezvous, the present invention for the first time allows efficient means for communicating personalized information into a database by utilizing other computers running an HTML browser with more familiar graphic user interface while allowing a thin device running a micro browser to access the same personalized information stored in the database.

According to one preferred embodiment of the present invention, a method for provisioning, through a thin device, a rendezvous to a user account in a server to ensure secure access to the user account by a networked computing device through the rendezvous having a URL, thereby the networked computing device can update managed information in the user account that is also accessible by the thin device, the method comprises:

initiating a transaction signal by the thin device to the server; the thin device having a client identification associated with the user account in the server and running a micro browser supported by a first communication protocol, wherein the transaction signal comprises the client identification and the URL of the rendezvous;
   examining a communication session between the thin device and the server, wherein the session examination between the thin device and the server comprising:
      creating the communication session between the thin device and the server if the communication session is not in existence or is not valid;
      conducting mutual authentication between the thin device and the server; and
      generating session credential information for the session such that subsequent transactions between the thin device and the server are encrypted by the session credential information; and
      establishing user credential information for the rendezvous by the thin device; and
      associating the user credential information with the rendezvous to the user account in the server.

Upon updating the user credential information to the rendezvous, the networked computing device with the correct user credential information can go through the rendezvous to the user account to edit, modify or update the managed information, e.g. a URL of a Web server, in the user account with a more convenient information entering means, such as an HTML browser. The thin device can immediately access the managed information, such as the specified URL, to retrieve pertinent information therefrom without the need to key in the URL that often has a number of alphabets.

The system for secure access to a user account in a server, through a rendezvous identified generally by a URL, the rendezvous being exclusively designated to the user account, the system comprising:

a data network comprising an airnet supporting a first communication protocol and a landnet supporting a second communication protocol, the landnet coupled to the server;
   a first client device, remotely located with respect to the server device and coupled to the airnet using a first communication protocol, having a client identification exclusively associated with the rendezvous and running a first browser;
   a second client device coupled to the landnet using a second communication protocol and running a second browser,
   means for mapping the first communication protocol to the second communication protocol and the second communication protocol to the first communication protocol; the first client communicating with the server via the communication protocol means;
   means for mapping the first communication protocol to the second communication protocol and the second communication protocol to the first communication protocol;
   means for creating an authenticated and secure communication session between the first client device and the server through the data network; the session creating means comprising:
      means for requesting the session by the first client device to the server if the session is not in existence or is not valid;
      means for conducting mutual authentication between the first client device and the server; and
      means for generating session credential information for the session in creation; and
      means, by the first client and through the created session, for updating the rendezvous with user credential information by a first browser such that the user account is accessible by the second client through the rendezvous with the user credential information.

Accordingly, an important object of the present invention is to provide a generic solution for self-provisioning a rendezvous to a corresponding user account created and authorized in a server;

Another object of the present invention is to provide a method and system for efficient and secure access to a user account by self-provisioning a rendezvous to the account as such any computer with a more convenient information entering means may update managed information in the account; and Other objects, together with the forgoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIGS. 2.a and 2.b illustrate a representation of system architecture of the present invention and a layout of a corresponding user account in a server in communication with a mobile phone and a PC;

FIG. 3 shows a typical example of a mobile device that houses one portion of the linked and complied processes disclosed in the present invention;

FIGS. 5.a and 5.b demonstrate a flowchart showing the corresponding processes in each of the involved devices, respectively.

DETAILED DESCRIPTION OF THE INVENTION

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Figure 1:
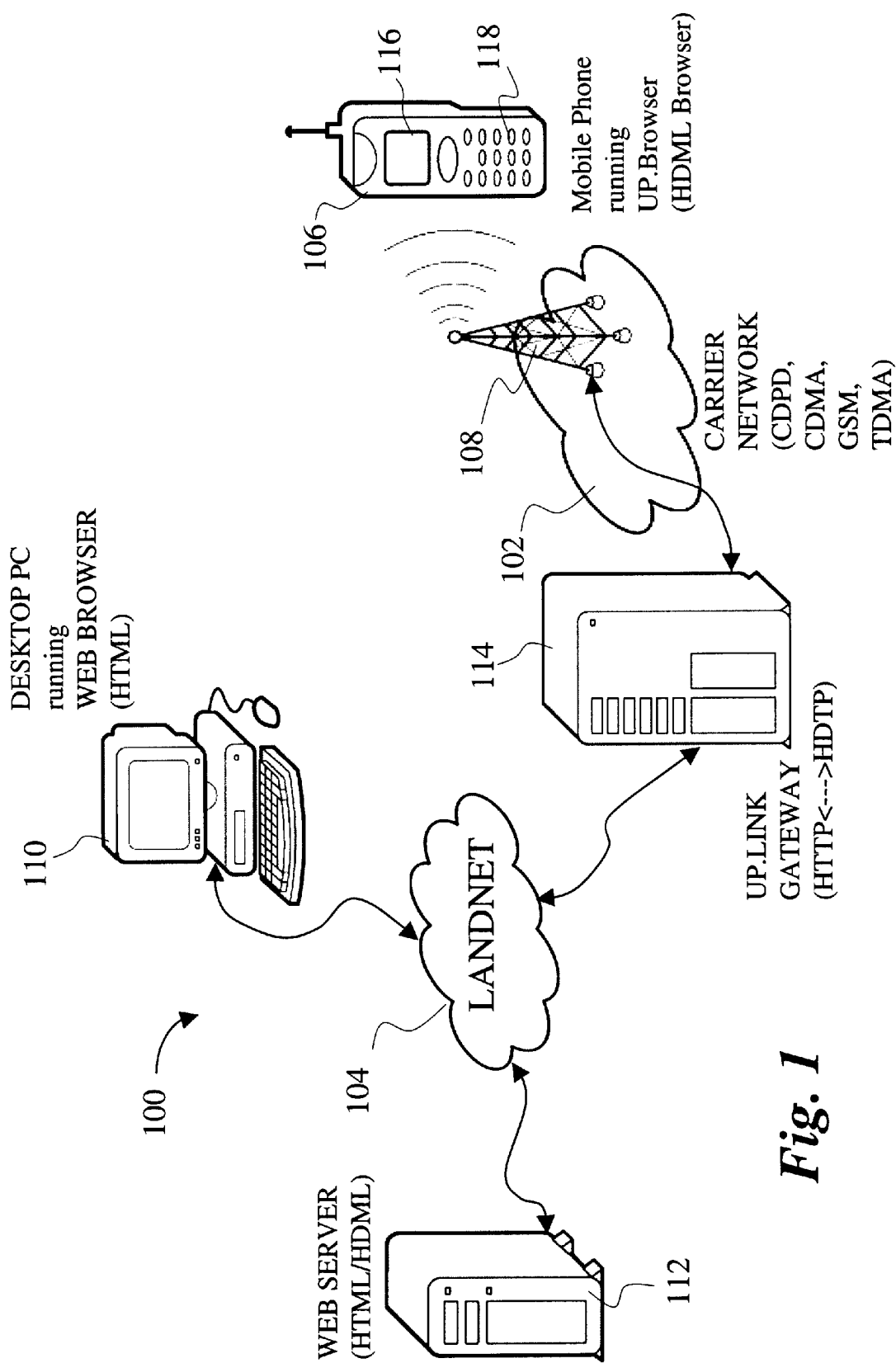
FIG. 1 shows a schematic representation of a data network in which the present invention may be practiced.

The following detailed description of the present invention is presented largely in terms of procedures, steps, logic blocks, processing, and other symbolic representations that resemble the operations of data processing devices coupled to networks. These process descriptions and representations are the means used by those experienced or skilled in the art to most effectively convey the substance of their work to others skilled in the art. The present invention is a method and system for self-provisioning a rendezvous through a thin device to ensure secure access by other devices to information in a database in a data network. The method along with the system or architecture to be described in detail below is a self-consistent sequence of steps leading to a desired result These steps or processes are those requiring physical manipulations of physical quantities. Usually, though not necessarily, these quantities may take the form of electrical signals capable of being stored, transferred, combined, compared, displayed and otherwise manipulated in a computer system or electronic computing systems. It proves convenient at times, principally for reasons of common usage, to refer to these signals as bits, values, elements, symbols, operations, messages, terms, numbers or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing system that manipulates and transforms data represented as physical quantities within the computing device's registers and memories into other data similarly represented as physical quantities within the computing device or other such as storage, transmission or display devices, Referring now to the drawings, in which like numerals refer to like parts throughout the several views. FIG. 1 shows a schematic representation of a data network 100 in which the present invention may be practiced. The data network 100 comprises an airnet 102 that is generally called wireless network and a landnet 104 that is generally a landline network, each acting as a communication medium for data transmission therethrough. The airnet 102, in which transmission is via the air, is sometimes referred to as a carrier network because each airnet is controlled and operated by a carrier, for example AT&T and GTE, each having its own communication scheme, such as CDPD, CDMA, GSM and TDMA for the airnet 102. The landnet 104 or the Internet, used interchangeably herein, may be the Internet, the Intranet or other private networks. Referenced by 106 is a mobile data device, but resembling a mobile phone therein, in communication with the airnet 102 via an antenna 108. It is generally understood that the airnet 102 communicates simultaneously with a plurality of mobile computing devices of which only a mobile or cellular phone 106 is shown in the figure. Similarly, connected to the Internet 104 are a plurality of desktop PCs 110 and a plurality of servers 112, though only one representative respectively is shown in the figure. The PC 110, as shown in the figure, may be a personal computer SPL 300 from NEC Technologies Inc. and runs a HTML Web browser via the Internet 104 using HTTP to access information stored in the web server 112 that may be a workstation from SUN Microsystems Inc.. It is understood by those skilled in the art that the PC 110 can store accessible information therein so as to become a web server as well. Between the Internet 104 and the airnet 102 there is a link server 114 performing data communication between the Internet 104 and the airnet 102. The link server 114, also referred to as link proxy or gateway, may be a workstation or a personal computer and performs mapping or translation functions, for example, communication protocol mapping from one protocol to another, thereby a mobile device 106 can be in communication with any one of the servers 112 or the PCs 110, respectively.

The communication protocol in the Internet 104 is the well known HyperText Transfer Protocol or HTTP and runs on TCP and controls the connection of a well known HyperText Markup Language Web browser, or HTML Web browser, to a Web server and the exchange of information therebetween. The communication protocol between the mobile device 106 and the link server 114 via the airnet 102 is Handheld Device Transport Protocol (HDTP), or Secure Uplink Gateway Protocol (SUGP), which preferably runs on User Datagram Protocol (UDP) and controls the connection of a HDML Web browser to a link server, where HDML stands for Handheld Device Markup Language, it is similar to that of HTML and a set of commands or statements that specify how information is displayed. The specifications of both HDTP and HDML, being considered as the wireless network standards, are provided at http://www.w3.org or http://www.uplanet.com and incorporated herein by reference. Further a reference specification entitled "Magellan SUGP Protocol", a HTTP specification with network security features is incorporated herein by reference as Appendix B. The HDTP is a session-level protocol that resembles the HTTP but without incurring the overhead thereof and is highly optimized for use in mobile devices that have significantly less computing power and memory. Further it is understood to those skilled in the an that the UDP does not require a connection to be established between a client and a server before information can be exchanged, which eliminates the need of exchanging a large number of packets during a session creation between a client and a server. Exchanging a very small number of packets during a transaction is one of the desired features for a mobile device with very limited computing power and memory to effectively interact with a landline device.

Referring now to FIGS. 2.a and 2.b, there is depicted a representation of the architecture 120 of the present invention. As described above, the airnet 102 communicates simultaneously with a plurality of two-way mobile communication devices, 122, 124 and 126, generally from a group consisting of mobile phones, two-way pagers and telephones, such as a Duette cellular phone from Samsung Telecommunication America, Inc. Due to the increasing reduction in size and weight and high portability, most of the mobile devices, considered as thin clients, have a very limited computing power, typically equivalent to less than one percent of what is provided in a typical desktop or portable computer, the memory capacity in a thin client is generally less than 250 kilobytes and the LCD display thereof is perhaps four lines high by twelve or twenty characters, the graphics capabilities thereof are very limited or nearly nonexistent and the general user interface is a keypad having far less buttons than a PC keyboard does. Therefore many transactions desired by users through such clients are preferably predetermined or pre-entered in their user accounts in a host server 128 as such the users need only to select desired transactions to perform or at most key in one or two letters corresponding to desired entries through the keypads of their cellular phones. For example, if there is a list of stock symbols of interest in a user account that is designated to a mobile phone, a user of the mobile phone will not have to key in the symbols every time he desires to look up for the price thereof currently being traded in the stock market. The list of stock symbols is previously entered to the user account. Evidently the most available and convenient means for now is to use a computing device that has powerful and full functional information entering capabilities. A PC is a typical example of such computing device, the PC can be equipped with the well-known HTML browser that provides a rich graphic user interface and an ideal environment for the user to manage his personalized information in his account.

As is well known, the Internet 104 is typically a landline network connecting computers that are provided the HTML browser. Referenced by 110 is a PC representing one of the computers that use the HTML browser running on HTTP to hyperlink to other computers/servers 132 or 134 to update/fetch information on line or simply copy files therefrom. It should be noted that "user account" and "database" have been used herein sometimes interchangeably when only one account is being addressed. It is generally understood that a database or an allocation of memory, as referenced by 130 in the FIGS. 2.a and 2.b, hosts a plurality of user accounts, each designated to an authorized capacity in which managed or personalized information is kept. Further it is understood that the database 130 can be an independent storage or physically a part of the host server 128. To access the personalized information therein from any computer on the Internet 104, one has to provide an account entry, namely a rendezvous, to a user account in the host server 128 or database 130 with a set of credential information such as a username and a password thereof. FIG. 2.b illustrates a layout of a typical user account assigned with a mobile phone 106. Each mobile phone is assigned to a device ID 140 which can be a phone number of the phone or a combination of an IP address and a port number, for example: 204.163.165.132:01905 where 204.163.165.132 is the IP address and 01905 is the port number. The device ID 140 is further associated with a subscriber number (sub #) 142 authorized by a carrier in the link server 114 as part of the procedures to activate the phone 106. The sub # may take the form, for example, of 861234567-10900_ pn.mobile.att.net by AT&T Wireless Service, it is a unique identification to the phone 106. In other words, each of the mobile devices 122, 124 and 126 has a unique device ID that corresponds to a user account in a server, respectively. It may be appreciated by those skilled in the art that the link server 114 does not have to be a separate sever to perform the communication protocol mapping, it can be just a part of the host server 128 and the protocol mapping is a part of functions the host server 128 provides.

A corresponding account 144 in the database 130 is indexed by an account structure 143 comprising the sub #142, user information 146, a username 148 and a password 150. The sub #142 is received from the link server 114 as an index to the account structure 143, the user information 146 comprises the account configuration and other account related information. The username 148 and the password 150, namely the user credential information, control the authentication to enter the account 144 in the database 130. From the data network perspective, any computer can logon through HTTP to the rendezvous 152 identified by an address identifier, often a universal resource locator (URL) taking the form of www.xyz.com. In other words, each account in a database is exclusively associated with a rendezvous identified by a unique URL. As shown in the figure, the PC 110 establishes a communication session with the rendezvous 152 based on a given URL of the rendezvous 152. However, to access the associated account 144 in the database 130, the PC 110 must provide a set of correct username and password to the rendezvous 152 that performs a verification thereof with the account structure 143. If the supplied username and password match those in the account structure 143, the access requested by the PC 110 is allowed. Otherwise, the entry to the account 144 is denied.

The PC 110 can update information stored in the account 144 when the supplied username and password are verified. Using the powerful and familiar HTML browser in the PC 110, a user can key in frequently request information, such as a list of stock symbols and a list of URLs of Web servers that provide services to the phone 106. An example will be provided later. All the information entered through the PC 110 becomes immediately available to the phone 106.

A process named webpwd.cpp in the code listing in the appended Microfiche Appendix A illustrates a provisioning process between the phone 106 and the link server 114 in one embodiment of the present invention. Upon the request of the phone 106, the process, specifically in a subprocess called setNameAndPasswordState(), allows the phone 106 to supply a username and a password and then send the newly supplied credential information to a second subprocess called submitstate() that checks if the entered username and password are acceptable, namely the username and password should have a certain length and contain no spaces or unrecognized characters with respect to a general rule of being a username and password. If the username and password are not acceptable, the subprocess submitState() returns to the phone 106 with a corresponding message being either "You must enter a name" or "You must enter a password". Otherwise, the newly entered username and password are sent to another subprocess called SetUserAuth() in a process called HTTPDBMSUerDB. The subprocess SetUserAuth() updates the username and password in the account structure 143, which immediately requires all subsequent logins to the account entry 152 with the newly supplied username and password. A subprocess Authenticate() examines a set of username and password supplied by the PC 106, it compares the username and password from the PC 110 to the ones in the account structure 143. If the comparison is successful, the subprocess Authenticate() returns a AuthPass flag that allows the PC 110 to access the account in the database. Otherwise, it returns a flag that denies the admission of the PC 100 to the account.

It should be noted that the communication between the phone 106 and the link server 114 is through the airnet 102 in FIG. 1. Message carrying proprietary information travelling in the air is not secure. To transact credential information over the open space to provision the rendezvous, user must have an efficient, reliable and secured manner to conduct private communications with the link server. According to one embodiment of the present invention, an authenticated and secure session between the cellular phone 106 and the link server 114 must be in place before the cellular phone, provisions the rendezvous through which the user accesses his/her account from other computers. It is necessary to refer to an architecture of a mobile phone before proceeding with the detailed description of creating the authenticated and secure communication between a user's phone (client) and a server. FIG. 3 is a block diagram of a typical GSM digital cellular phone 160. Each of the hardware components in the cellular phone 160 is known to those skilled in the art and so the hardware components are not to be described in detail herein. Although the user interface of the phone 160 is not shown in detail in the figure, the mobile device 118, resembling a cellular phone, in FIG. 1 may be referenced thereto, in which referenced by 116 is a LCD screen and 118 is a key button pad, respectively. The screen 116 prompts user what to proceed with the keypad 118, with a sequence of key entries and through the phone 160, a user can interactively communicate with a server through the airnet, link server and the Internet. According to one embodiment of the present invention, complied and linked processes of the present invention are stored in ROM 162 as a client module 164 and support module 166. Upon activation of a predetermined key sequence utilizing the keypad 118, a physical layer processor or microcontroller 118, initiates a session communication to the server using the module 164 in the ROM 162.

To establish a secured communication between a cellular phone (a client) and a server, an authentication process must be conducted first to ensure that only interested parties are actually in the communication therebetween. According to one embodiment of the present invention, the code listing thereof being provided in the appended Microfiche Appendix, the process is complete through two rounds of independent authentication, one being the client authenticated by the server, referred to as client authentication, and the other being the server authenticated by the client, referred to as server authentication. Further each authentication is completed in two separate steps for high grade of security, which will be described in detail below. The success of the mutual authentication processes provisions an evidence that the two communicating parties possess a valid shared secret encrypt key through a mutual decryption and a challenge/response mechanism. The mutual decryption mechanism comprises the steps of mutually recovering encrypted messages from two involved communicating parties. The challenge/response mechanism, referred to as nonce verification, verifies a predetermined relationship between a sent nonce and a received derivative thereof.

Figure 4:
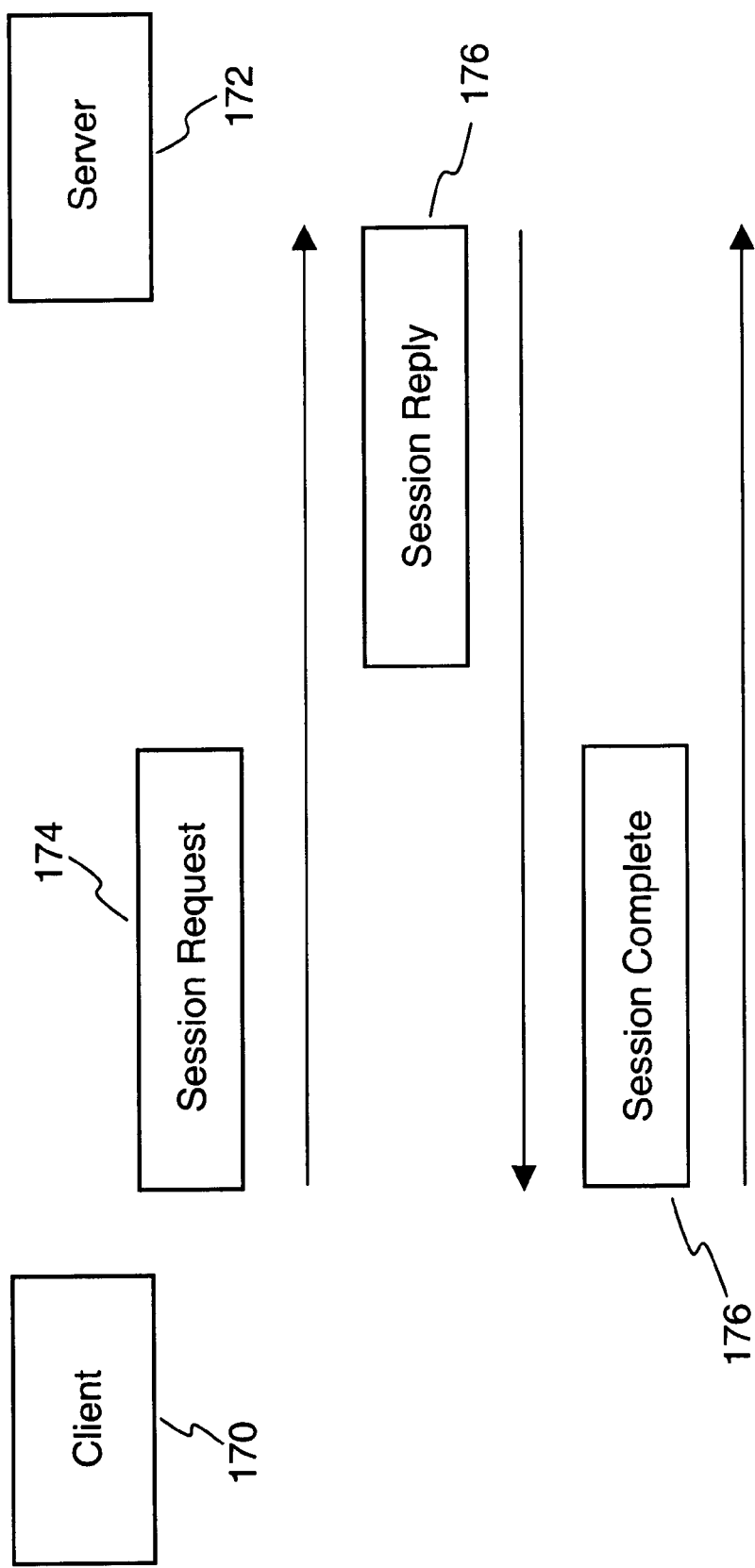
FIG. 4 illustrates a schematic representation of a mutual authentication process between a mobile device and a host server to ensure subsequent information transacted therebetween is secured.

In one preferred embodiment of the present invention, the authentication process is conducted with three message exchanges; a Session Request (SR), a Session rePly (SP), and a Session Completion (SC). FIG. 4 illustrates a schematic representation of the authentication process. The client 170, representing a mobile device or the cellular phone 106 of FIG. 1, to conduct a transaction with the server 172, representing a link server 114 of FIG. 2, initiates a SR 174 to be sent to the server 172 by first creating a client proto-session. A client proto-session is a session data structure that gets initialized when a session creation starts. The initialized SR 174 comprises the following essential information:

sessionID—an identifier identifying all requests from the client to the server; in the case of requesting a session creation, sessionID is always assigned to 0;

cipher—a two-byte number representing the choice of the encryption the client is currently using as there are a number of encryption schemes available in a communication protocol;

deviceID—a variable up to 255-byte, representing the device identifier or the client identifier, comprising a phone number of the device or an IP address and a port number, e.g. 204.163.165.132:01905; and C-nonce—a client nonce represented with a non-repeatable number, usually 2 bytes, used for the client to conduct a following server authentication.

C-nonceModified—a modified version of the client nonce, used for the server to conduct a nonce verification in the following client authentication.

Further the cipher in the SR 174 includes an identifier to an encryption algorithm and associated parameters thereof. To be more specific, the first byte in the cipher represents an identifier to a combination of the encryption algorithm, the key size (e.g. 128-bit for US or 40-bit for foreign countries) and content of a security attachment thereto and the second byte in the cipher indicates the additional parameters related to the first byte. For example, value 1 in the first byte indicates that the encryption algorithm is block cipher RC5, the key size thereof is 128 bit, a two byte check-sum therein is used as the MAC (Message Authentication Code), no IV (Initialization Vector for block ciphers) therefor is transmitted over the network, and padding bytes are added if necessary. The block cipher algorithm RC5 is part of the RSA's BSAFE product. It can be further appreciated that the identifier in the cipher may be assigned to a unique value to identify a non-secure session if so desired. The C-nonce is a non-repeatable number initially and randomly generated in the client and the modified version thereof, C-nonceModified, is generated from the C-nonce through an operational relationship; for example the Exclusive-OR relationship or expressed as follows:

$$\text{C-nonceModified} = \text{2-byte-number} \oplus \text{C-nonce}.$$

It can be appreciated by those who are skilled in the art that there are many ways to get the C-nonceModified from a C-nonce, the Exclusive-OR is one of the operational relationships used in one embodiment of the present invention. Both C-nonce and C-nonceModified are encrypted using the shared secret encrypt key between the client 170 and the server 172. The purpose of the C-nonceModified is to provide the server that receives the SR with means for ensuring that C-nonce is correctly decrypted and validated by examining the C-nonce and its relationship with the C-nonceModified. Both should not be altered after a successful decryption of the C-nonce and the C-nonceModified. In other words, a SR message or signal may be expressed as follows:

$$SR = \{\text{session ID, cipher, device ID, Encry[nonce, nonceModified]}\};$$

where Encry[ ] means that the parameters or contents in the bracket are encrypted accordingly. When the SR is sent by the client to the server to request a session creation, both C-nonce, C-nonceModified are encrypted according to the cipher the client is using at the time the SR is sent out.

Upon receiving the SR from the client 170, the server 172 creates a server proto session for the client 170 with a session identifier, referred to as session ID, to identify the session context for the session just created in the server 172. A server proto-session is a session entry marked as a proto status in a session table, which indicates that the session is not authenticated and is not able to conduct any transactions with the client. It is understood to those skilled in the art that the proto-session can be kept in the RAM of the server. If a proto-session already exists for that client, it is re-used. The information in the received SR is saved in the server proto-session. If the server 172 is satisfied with the fact that the client is known, namely Encry[C-nonce, C-nonceModified] in the received SR are successfully decrypted with the shared secret encrypt key, the step one in the client authentication is successful and a corresponding session key is generated and stored with the server proto session entry. It may be noted herein that many encryption schemes used in this invention, such as the scheme utilizing RC5, have a procedure that adds and validates the Message Authentication Code such as the check-sum, to assure that the encrypted message is correctly decrypted, the procedure, every time the decryption takes place, is used herein to examine the transaction integrity, namely to assure the received messages or signals are unaltered in the cause of data transmission. If the step one client authentication is not successful, namely Encry[C-nonce, C-nonceModified] in the received SR are not fully decrypted or supported, the proto session is aborted and removed from the proto session table, resulting in a failed session creation. What the support means herein is the cipher proposed or used by the client is also used by the server, for example the client uses the RC5 encryption to encrypt Encry[C-nonce, C-nonceModified], to decrypt Encry[C-nonce, C-nonceModified], the server must be equipped with the same RC5 encryption capability therein. If Encry[C-nonce, C-nonceModified] can not be successfully decrypted due to other reasons such as transmission errors, the client must reinitiate a new session request to the server in order to establish a secure communication with the server. To challenge the step two server authentication subsequently at the client side, a derivative of the client nonce or C-nonce, is generated therefor. In one embodiment of the present invention, the derivative is created by adding a constant to the client nonce, for example derivative=C-nonce+1. The purpose of the derivative is to provide the client with means for reassuring that the C-nonce is correctly decrypted by the server and the server is the correct server with which the client should be in communication.

Right after the successful step one client authentication, the server 172 responds to the client with a Session rePly (SP) 176 to begin a second round authentication; server authentication. The SP 176 comprises the following information:

C-SID—a one byte number indicates the sessionID originally assigned in the client, to be more specific C-SID=0 indicates a clear text client session, C-SID=1 indicates a shared secret key encrypted session, and C-SID=2 indicates a session key encrypted session. In the context of the current description, C-SID=1.

sessionID—a four-byte number representing an identification and parameters, such as a session encrypt key, of the session created by the server for the client;

key—a session key to be used with a mutually acceptable encryption, and to be used for encryption and decryption in all transactions in the session;

derivative—a number derived from the C-nonce for the client to perform the subsequent server authentication;

S-nonce—a non-repeatable number, used for the server to conduct a following step-two client authentication; it should be noted that S-nonce is generated by the server and generally different from the C-nonce by the client; and cipher—a two-byte number representing the choice of the encryption the server proposes after the client proposed cipher is received, It may or may not be the same as the one used in the client, to be more specific, the cipher is the same as the one proposed by the client when the server supports the client proposed cipher, otherwise the cipher is the one currently used in the server.

In other words, the SP can be expressed as follows:

$$SP=\{C\text{-}SID, Encry[sessionID, key, S\text{-}nonce, derivative, cipher]\};$$

When the client 170 receives the SP 176 from the server 172, it performs the step one server authentication, which is considered successful if Encry[sessionID, key, S-nonce, derivative, cipher] in the received SP 176 is decrypted successfully with the shared encrypt key. If the step one server authentication fails, the client 170 discards the SP 176 and a new session creation may be started over again. Upon the success of the step one server authentication, the client 170 proceeds with the step two server authentication; namely the predetermined relationship between the C-nonce and the derivative thereof should be held for a successful step-two server authentication:

$$C\text{-}nonce=derivative-1$$

If the C-nonce derived from the SP 176 is the same as the C-nonce originally generated by the client, the step two server authentication is successful, hence the server 172 is considered authenticated, trusted from the viewpoint of the client, and the SP 176 is accepted as a valid message, which means that the client 170 then uses the session key and other information in the SP 176 for the session being created. Only with both successful steps of the server authentication, the client 170 marks the session as committed, which means that transactions can be conducted subsequently in the session, again only from the viewpoint of the client 170. If the predetermined relationship between the client nonce and the derivative thereof does not hold, the step two server authentication fails and the received SP 176 is discarded. The client 170 may abort the session creation process if no further SP's are received and pass both steps of the server authentication during the time period allowed for a session creation. To provide the server with means for reassuring the client authentication by itself through the client, a derivative of the S-nonce, similar to the derivative of the C-nonce, is generated.

The client 170 then sends the server 172 a SC 178 to complete the session creation process. The SC 178 comprises the following information:

$$SC=\{Encry[derivative]\};$$

where the derivative is the client's response to the server nonce challenge, namely the result of the verification, the derivative is used by the server 172 for step two client authentication. Further it is noted that the SC 178 is an encrypted message, meaning that the client encrypts the information in the SC 178 according to either its own cipher or the server proposed cipher. Generally the client 170 encrypts the information in the SC 178 according to the server proposed cipher if it accepts the server proposed cipher, otherwise, it encrypts the SC according to its own cipher.

Upon receipt of Session Complete or SC 178, the server 172 tests if the client 170 uses its own proposed cipher or the server proposed cipher by decrypting the SC twice using the two ciphers if necessary. If the server 172 decrypts the encrypted message in the SC 178 and verifies the relationship thereof with the S-nonce, the step two client authentication is succeeded. Subsequently the server 172 promotes the server proto session to the active session and the session creation process is completed, thereby an authenticated and secure communication session is established between the client and the server. Any transactions in the established communications session are now encrypted by the session key created in the server according to a cipher mutually agreed by both the client and the server, thereby the transactions between the client and the server are truly proprietary. A code listing of one embodiment of the mutual authentication is listed in the Appendix A.

Referring now to FIGS. 5.a and 5.b, each illustrates a flowchart showing the processes of the present invention in each involved device, respectively, in conjunction with FIGS. 6, 7, 8, 9 and 10 demonstrating examples of personalizing a user account being accessed through a self-provisioned rendezvous. A client 200, which can be a cellular phone, in FIG. 5.a is one of the mobile devices communicating with a server 250 in FIG. 5.b through a data network that is not shown in these figures but illustrated in FIG. 1 or FIGS. 2.a and 2.b. It should be noted that the server 250 functions as a link server and a host server. The functional flowcharts on the client and server sides are conjointly described in the following with respect to a cellular phone. Nevertheless it will be appreciated by those skilled in the art that a server, without reciting specifically a link server or a host server, as referenced by 250 can perform similar functions, this becomes evident when the client is a landline device having direct communication to the Internet.

As part of the procedures to activate a cellular phone, a user account, or sometimes called device account, is created in the server 250, the account is exclusively associated with the phone or client 200. In other words, each mobile device in the data network has its own account identified by a corresponding device ID and subsequently a sub # in the server 250. The account for the client 200 is therefore created and configured at 252 according to services subscribed by the client 200. Meanwhile a corresponding account structure, similar to 143 in FIG. 2b, is initiated at 254. With an established account in the server 250, the client 200 becomes one of the clients capable of communicating with any computers in a data network.

When a user desires to update his personalized information in his account, he needs to first self-provision the rendezvous associated with his account using the client 200. The phone therefore requests a communication session to the server 250 at 202 for subsequent transactions to take place in an authenticated and secure communication session. From the session creation described above, it can be appreciated that the session creation requested by the client 200 includes a piece of device information assigned to the client 200. If, at 204 and 206, the device information sent to the host is not recognized by the contacting host 250, no communication session can be possibly established therefor. Meanwhile the host 250 receives the session request from the client 200, as part of the session creation process, the device information is examined at 260 and the session creation process proceeds when the device information is verified at 262, that means that the device 200 has an authorized account therein. At 208 and 264 respectively, a mutual authentication process between the client 200 and server 250 takes place. As described above, the mutual authentication process comprises a client authentication and a server authentication, each further comprising two respective steps to ensure that the communicating party is authenticated. Resulting from the mutual authentication process or once the session is created and authenticated at 210 and 266 of the client 200 and the server 250, respectively, a set of session credential information is generated. The session credential information comprises a session ID, a session key and a session cipher. The session ID is used to distinguish the session from other sessions that the host is creating or has already established with other mobile devices or clients, and the session key and the session cipher are to encrypt transactions between the client 200 and the server 250. At 212, the client 200 is acknowledged that there is a rendezvous associated with the account designated to the phone 250. If the user desires to update his personalized information in the account created and authorized in the server 250, he may proceed at 214 with the rendezvous that is generally identified by a URL provided by the host 250 and is subsequently prompted for a set of user credential information, such as a username and a password. At 216, the user credential information is entered. The credential information is then sent to the host 250 at 218, which includes a process of ensuring the newly supplied username and password satisfy a general rule of being a username and a password. The username/password ensuring process has been discussed above and the code listing thereof is in Appendix A. Meanwhile the host 250 has acknowledged that the client 200 is about to receive a set of new user credential information and expects it therefrom at 268. As soon as the new user credential information has arrived, the server 250 updates the user credential information associated with the rendezvous at 270. In other words, to pass through the rendezvous to the user account now by other devices, the new credential information must be provided.

Figure 6:
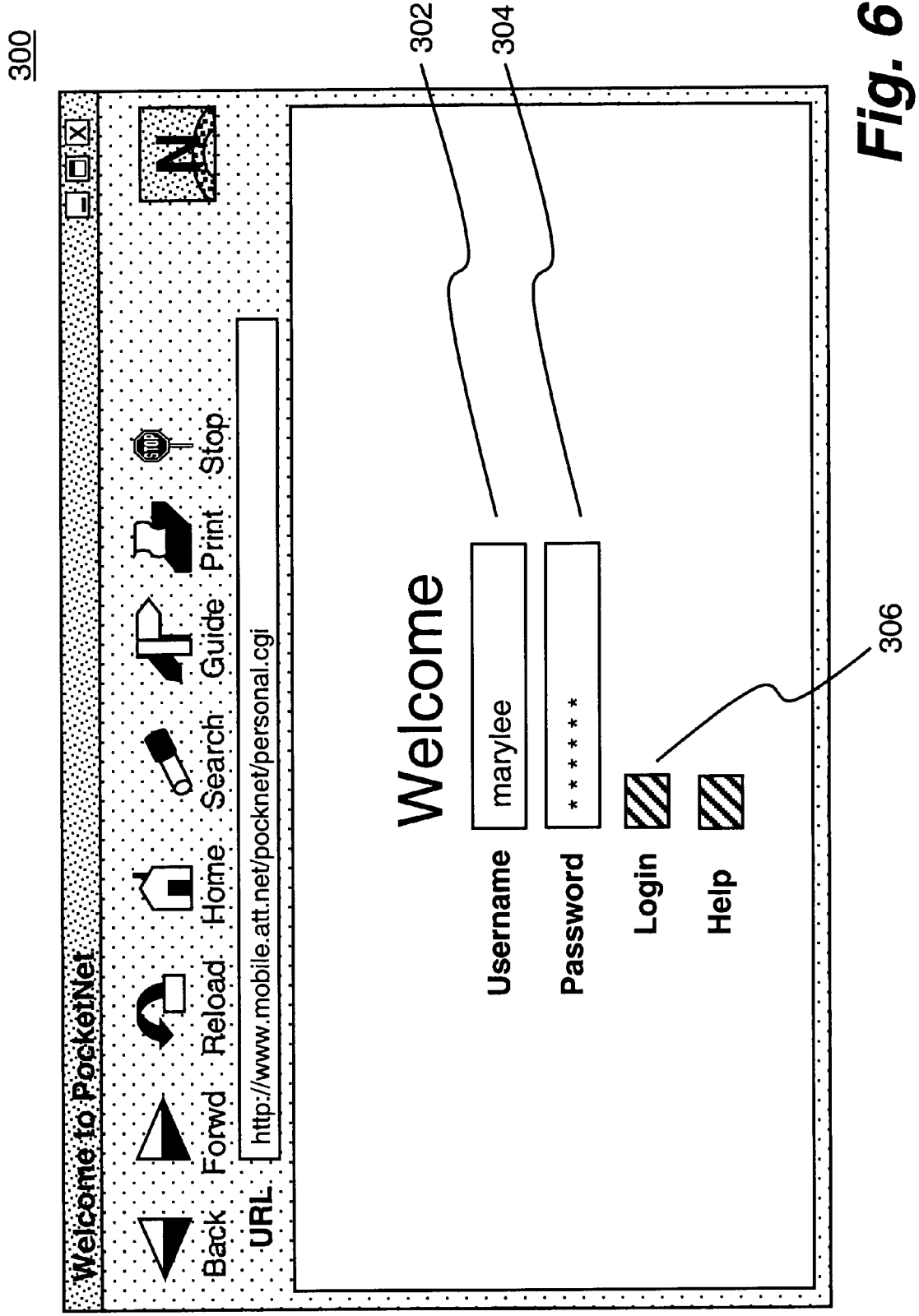
FIGS. 6, 7, 8, 9 and 10 illustrate, respectively, examples of personal g a user account being accessed through a self-provisioned rendezvous.
Figure 7:
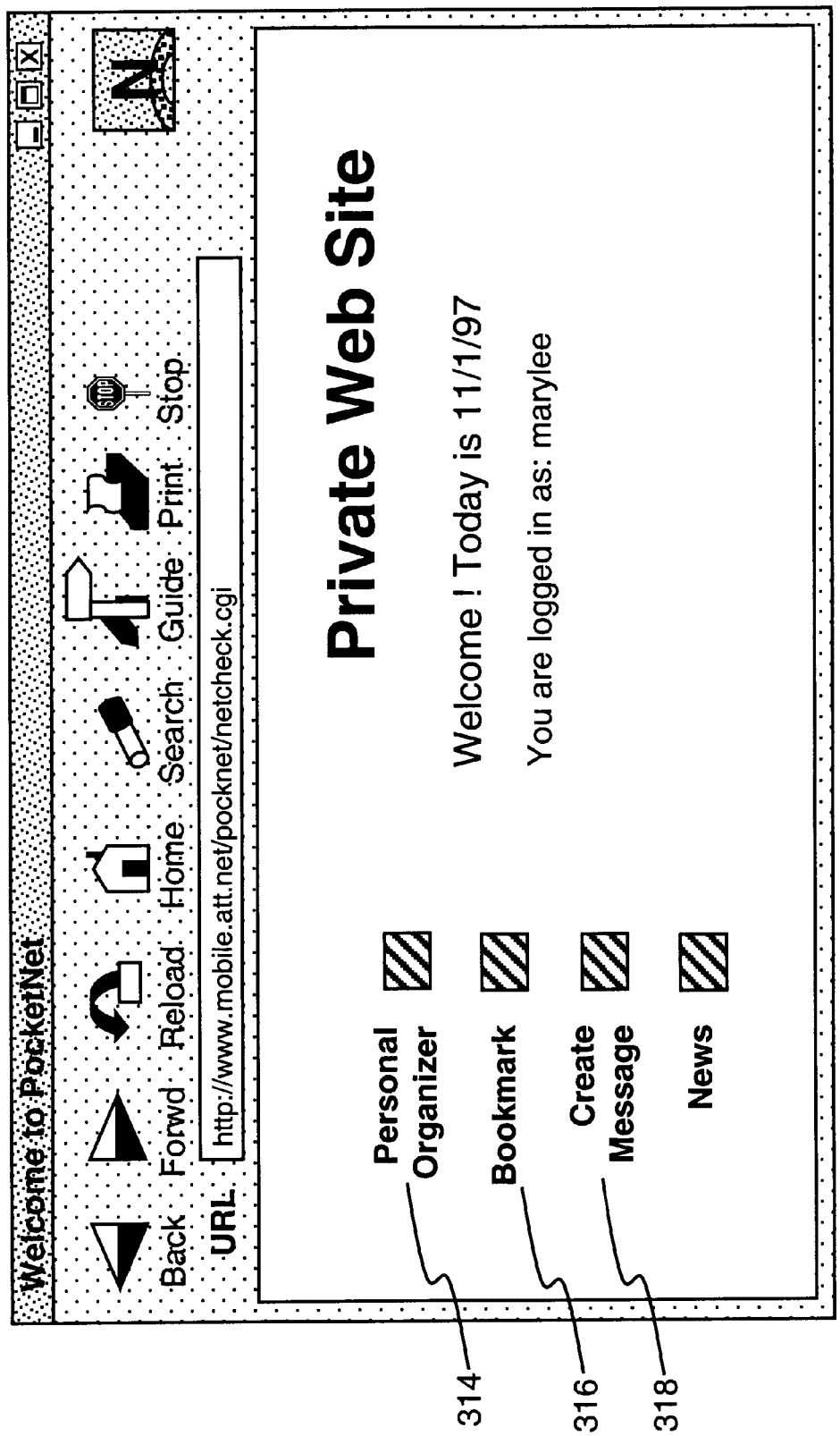
Figure 8:
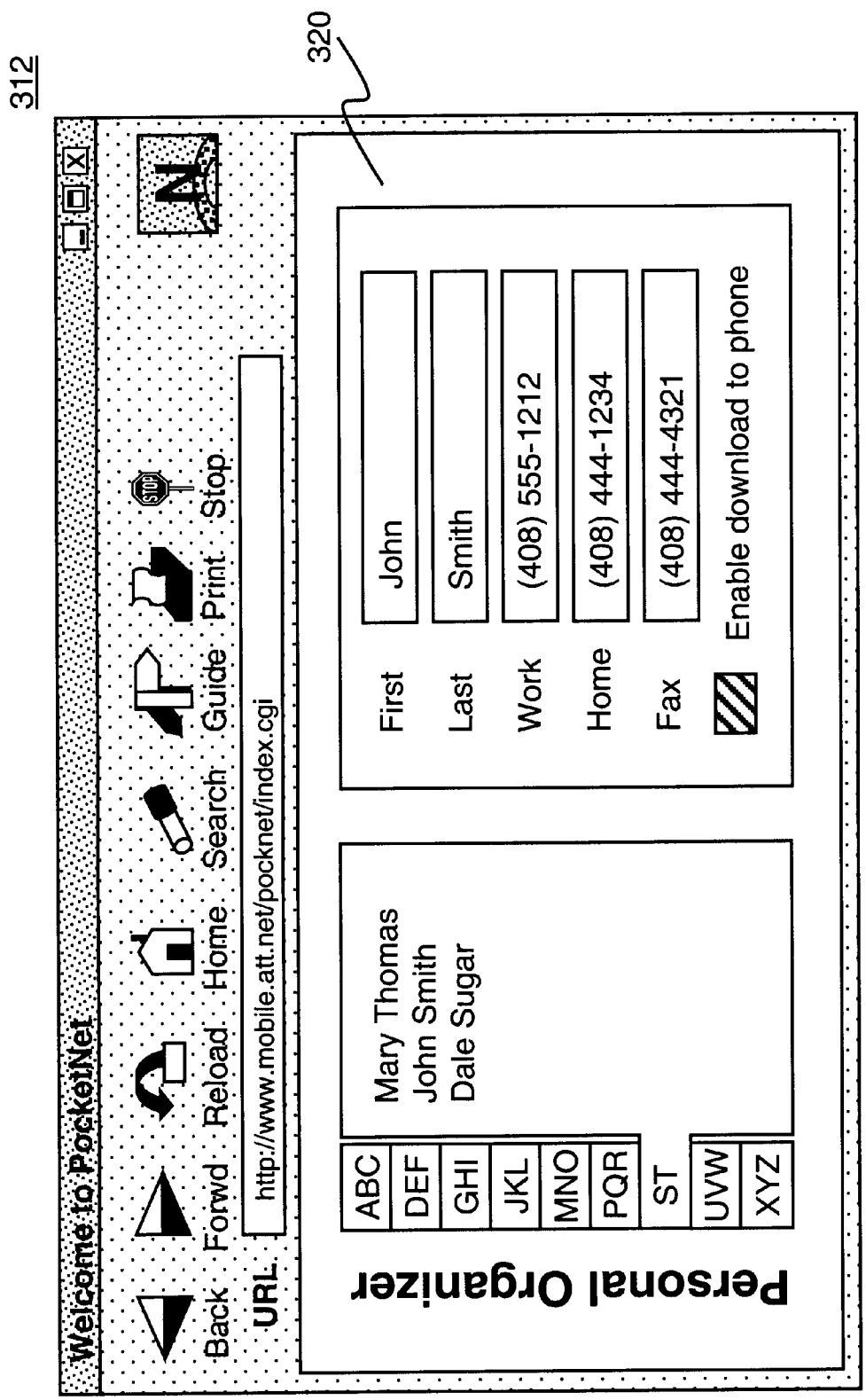
Figure 9:
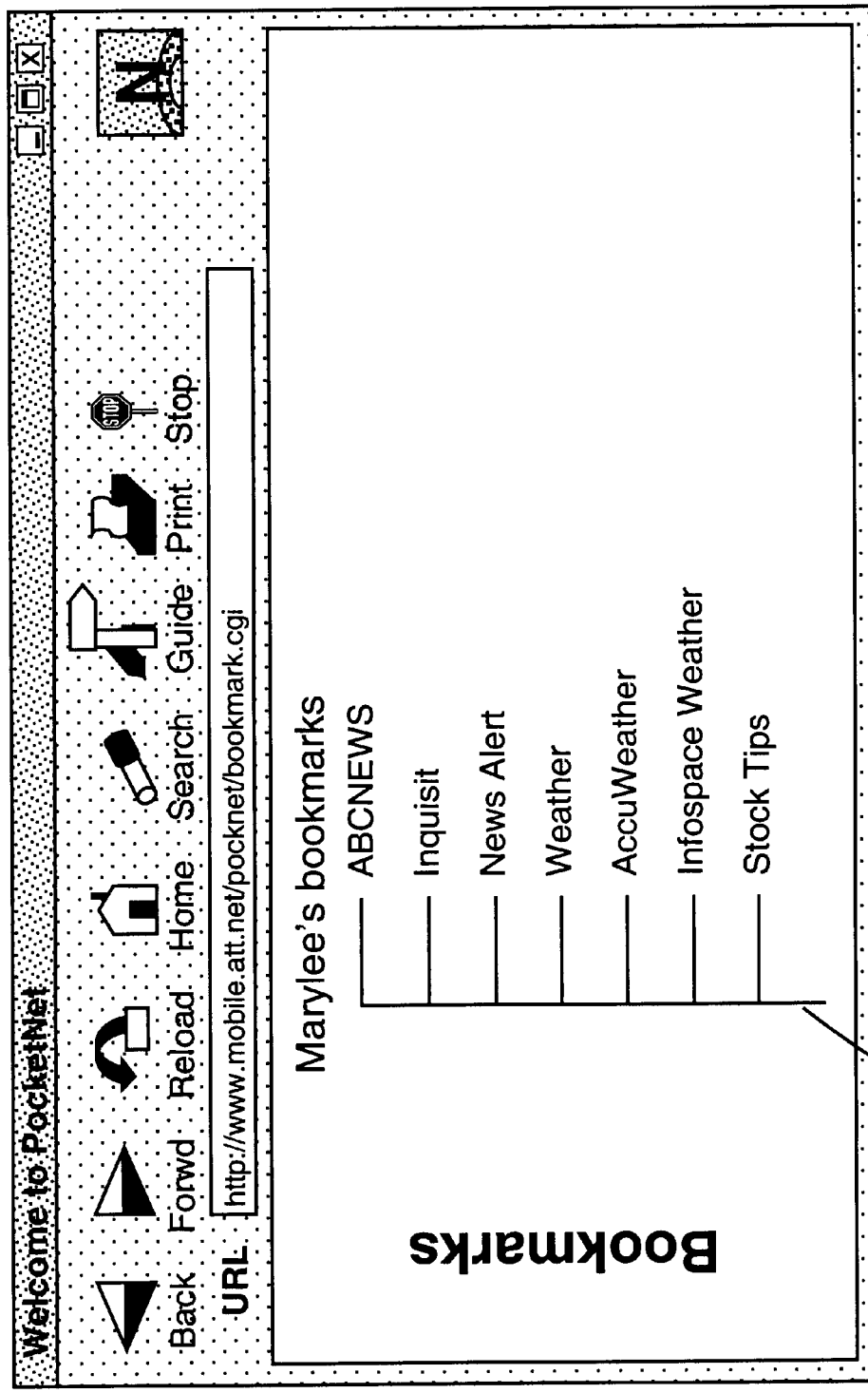
Figure 10:
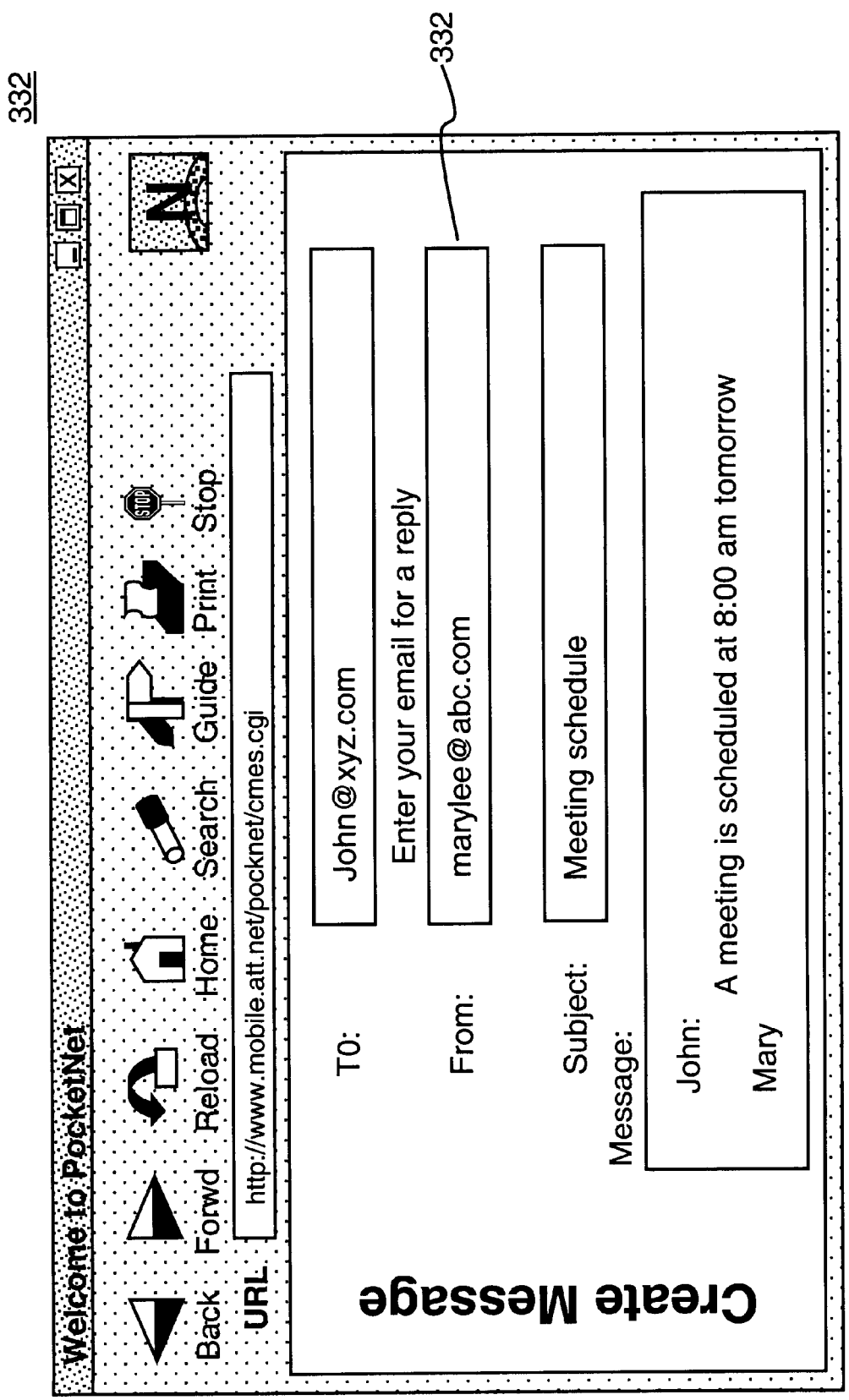

With the newly updated user credential information, the user can now log onto the rendezvous from any computer in the data network. A PC, which is not shown, connected to the data network, is equipped with a familiar HTML-based browser, preferably from Netscape Communication Corporation or Microsoft Corporation. As an example, it is assumed that a user has just provisioned a rendezvous with a username being "marylee" and the corresponding password being "123456". The user now goes to a networked PC that runs a Navigator browser from Netscape Communication Corporation and logs onto the rendezvous based on the URL of the rendezvous. FIG. 6 shows an interactive web page 300 received from the server 250 after the PC made the connection to the rendezvous. It is understood to those skilled in the art that the page and subsequent pages can be constructed with HTML along with CGI script/Java applets, where the process, CGI stands for Common Gateway interface, to receive information entered from a user. To update his personalized information in his account, the user must provide the newly created username and password required at 302 and 304. It should be noted that the password entered is generally not echoed at 304 and instead indicated with a asterisk corresponding to a letter entered. When the login icon 306 is activated, the entered username and password are retrieved and sent, through the network, to the server 250 in which the entered username and password are verified; namely the entered username and password match those entered and authorized by the user through the client 200. The user is then prompted with a second web page 310 shown in FIG. 7 in which the username is displayed as referenced by 312. To categorize personalized information in the account, the web page 310 comprises entries to other specific service pages, such as Personal Organizer 314, Bookmarks 316 and Create a Message 318. All these pages are accessible by the user to personalize his desired information therein. FIG. 8, for example, is a page 326 of the Personal Organizer 314 showing a personalized address book 320 that allows the user to edit his frequently contacted people's phone numbers and other information. FIG. 9 is a page of the Bookmarks 316 that allows the user to establish a list of web sites he may frequently visit through his cellular client 200, for example, StockTIPS referenced by 322 allows the user to keep a list of stock symbols there. With the personalized bookmarks, the user, when on the go, can quickly enter into the web pages having his list of the stock symbol to look up for the prices thereof currently being traded in the stock market without keying in any symbols at all. As a convenient feature, the page 330 in FIG. 10 allows the user to create an email message and be replied to a different address at 332 decided by the user, which eliminates the inconvenience of typing a lengthy message through a phone keypad and reading a replied message at the small screen in the client 200.

The contents in the exemplary pages respectively shown in FIGS. 6, 7, 8, 9 and 10 composed by HTML are accessible by an HDML browser through a server providing communication protocol mapping and markup language translation functions. Similarly information or messages entered on the client 200 composed by HDML are equally accessible by any computer equipped with an HTML browser through the same server in the data network. The duality of the information updating through two different mark-up languages provides a useful means for efficiently managing a personal account and solves substantially the problems of inconvenient data entry through a less functional keypad.

The present invention has been described in sufficient detail with a certain degree of particularity. It is understood to those skilled in the art that the present disclosure of embodiments has been made by way of example only and that numerous changes in the arrangement and combination of parts as well as steps may be resorted without departing from the spirit and scope of the invention as claimed. For example, any mobile devices equipped with a micro browser, e.g. HDML browser, may be connected, using an adapter, to the Internet directly without going through the airnet, the emerging Internet-enabled electronic appliances are also Internet-connected, all have limited computing powers and keypads but are capable of communicating with a server in a data network. The mutual authentication between such devices and the server thus becomes less complicated. The mutual authentication needs a process of having the client, such as a controller of the electronic appliance, authenticated by the server and having the server authenticated by the client. The process can be carried out in existing encryption mechanisms in HTTPS (an extended version of HTTP with built-in security), in which case, the link server could be replaced by a built-in capability in the device, or the HTTPS or the transceiver or somewhere in the connection to the Internet. The principles of the present invention may still be practiced in such configuration. Accordingly, the scope of the present invention is defined by the appended claims rather than the foregoing description of one embodiment.

What is claimed is:

1. A method for accessing managed data contained in a data network system, the method comprising:

executing a first set of program instructions in a wireless telephone of a subscriber, the wireless telephone having a display screen and being in communication, over a wireless data network, with a server hosting the managed data, the managed data being uniquely associated with the wireless telephone of the subscriber and being accessible by a computing device executing a second set of program instructions and coupled to the server through a wired data network, the computing device being able to alter the managed data at the server via the wired data network, wherein the wireless data network and the data network utilize a first communication protocol and a second communication protocol, respectively;

sending a request to the server to retrieve the managed data after activation of a predefined key of the wireless telephone;

receiving, at the wireless telephone, the managed data from the server via the wireless data network, the managed data being presented in a first markup language interpretable by the first set of program instructions when presented to the wireless telephone and being presented in a second markup language interpretable by the second set of program instructions when presented to the computing device; and displaying the managed data on the display screen of the wireless telephone.

2. The method as recited in claim 1, wherein the managed data comprises an address book and bookmarks entered from the computing device executing the second set of program instructions.

3. The method as recited in claim 1, wherein the first markup language is the same as the second markup language.

4. The method as recited in claim 1, wherein the first markup language is Handheld Device Markup Language (HDML) and the second markup language is Hypertext Markup Language (HTML).

5. The method as recited in claim 1; wherein the request comprises an address identifier identifying the server.

6. The method as recited in claim 5, wherein the address identifier is a universal resource locator (URL).

7. The method as recited in claim 1, wherein the managed data comprises a plurality of selectable hyperlinks, each of the hyperlinks providing access to a resource in the data network; and wherein the displaying comprises displaying at least one of the selectable hyperlinks on the display screen of the wireless telephone using the first set of program instructions.

8. The method as recited in claim 7, wherein the first set of program instructions is included in a first browser being operated in the wireless telephone and the second set of program instructions is included in a second browser being operated in the computing device.

9. The method as recited in claim 8, the method further comprising:

sending a new request from the wireless telephone to the server using the first set of program instructions to fetch information identified by one of the hyperlinks when the one of the hyperlinks being displayed is selected.

10. A method for accessing data contained in a data network system, the method comprising:

hosting, at a server, data associated with an account for a wireless telephone having a display screen, the data comprising a plurality of information categories and being accessible by a computing device remotely located and coupled to a data network selected from a group consisting of the Internet, a private network and a network of private networks;

receiving a request from the wireless telephone through a wireless data network to access the data, the request comprising a selection of one of the information categories;

retrieving information pertaining to the selected category if such information is co-located with the account and after the request is authenticated with respect to the account; and forwarding the information to the wireless telephone in a first format displayable on the display screen of the wireless telephone.

11. The method as recited in claim 10, wherein the request is an update to the one of the information categories and causes the data to be updated with the update.

12. The method as recited in claim 10, further comprising:

prompting the computing device for credential information when the computing device accesses the data;

providing access to the data in a second format after the credential information is verified; and updating the data upon receiving updated information from the computing device.

13. The method as recited in claim 12, wherein the first format is in a first markup language and the second format is in a second markup language.

14. The method as recited in claim 10, wherein the data comprises a plurality of hyperlinks, and the selected category is one of the hyperlinks; and wherein the retrieving further comprises:

contacting a resource identified by the one of the hyperlinks over the data network;

fetching the information in a second format from the resource; and converting the respective information in the second format to the first format.

15. The method as recited in claim 14, wherein the first format is a first markup language and the second format is a second markup language.

16. A method for interacting with managed data from a wireless computing device or a wired computing device, the managed data being stored on a server coupled to a data network, said method comprising:

permitting access to the managed data in a secure manner via the wired computing device;

receiving user input from the wired computing device;

altering the managed data being stored at the server based on the user input from the wired computing device; and thereafter permitting access to the managed data in a secure manner via the wireless computing device and then forwarding the managed data to the wireless computing device for use therein.

17. A method as recited in claim 16, wherein the managed data is used on the wireless computing device to generate screen displays on a display screen of the wireless computing device.

18. A method as recited in claim 16, wherein the managed data comprises at least one of address book data and bookmark data.

19. A method as recited in claim 16, wherein the managed data comprises user account data.

20. A method as recited in claim 16, wherein the wireless computing device is associated with a user; and wherein the managed data is personalized information of the user.

21. A method as recited in claim 16, wherein said method further comprises:

altering the managed data being stored at the server based on the user input from the wireless computing device.

22. A method as recited in claim 16, wherein the wired computing device is a personal computer.

23. A method as recited in claim 16, wherein said permitting access to the managed data in a secure manner via the wireless computing device comprises:

authenticating the wireless computing device to the server; and authenticating the server to the wireless computing device.

24. A method as recited in claim 16, wherein the wired computing device is a personal computer having a standard size keyboard, and the wireless computing device is a small, handheld device having a telephone-type keypad.

25. A method as recited in claim 24, wherein the managed data represents frequently requested data, thereby improving ease of use of the wireless computing device by allowing entry of the frequently requested data through use of the standard size keyboard, yet being for use by the wireless computing device.

26. A method as recited in claim 16, wherein the wired computing device is a personal computer having a substantially more powerful user input mechanism than the wireless computing device which is a small, handheld device, wherein the managed data represents frequently requested data, and wherein said method improves ease of use by allowing entry of the frequently requested data through use of the more powerful input mechanism of the wired computing device, yet the frequently requested data so entered being for use by the wireless computing device.

27. A method as recited in claim 26, wherein a user input mechanism for the wireless computing device has ambiguous keys that require several key strokes to input a particular key, whereas the more powerful input mechanism has non-ambiguous keys require only a single keystroke to input a particular key.

28. A method as recited in claim 16, wherein the wireless computing device is a cellular telephone.

29. A method as recited in claim 28, wherein the wired computing device is a personal computer.

30. A method as recited in claim 16, wherein said permitting access to the managed data in a secure manner via the wired computing device uses a self-provisioning rendezvous.

31. A method as recited in claim 30, wherein the self-provisioning rendezvous is accessed by an address identifier.

32. A method as recited in claim 31, wherein the address identifier is a universal resource locator (URL).

33. A computer readable medium containing program code for accessing data contained in a data network system, the computer readable medium comprising:

first program code for displaying the data on a display screen of a wireless device, the data comprising a plurality of selectable information categories and hosted in a server with at least one of the information categories hyperlinking to a resource on a data network, the data also being accessible though a computing device remotely located and coupled to the data network;

second program code for receiving a selection of one of the information categories when the one of the information categories is selected by a user;

third program code, executable in response to the selection, for sending a request for information identified by the selection to the server;

fourth program code for receiving the information from the server in a first format; and fifth program code for displaying the respective information on the display screen.

34. The computer readable medium as recited in claim 33, wherein the selection is made through a keypad with reference to the information categories being displayed on the display screen.

35. The computer readable medium as recited in claim 33, wherein the first format is a markup language.

36. The computer readable medium as recited in claim 33, wherein the computer readable medium further comprises:

sixth computer program code for receiving updated information entered from a telephone keypad; and seventh computer program code for sending the updated information to the server, the data being updated with the updated information.

37. A computer readable medium containing program code for accessing data in a data network system, the program code comprising:

a first program code for receiving a request, through a wireless data network, sent from a first browser being executed in a wireless telephone to access the data hosted in a database; the data associated with the wireless telephone and being accessible via a second browser executing on a computing device coupled to a data network that is part of the data network system;

a second program code for authenticating the request with respect to an account associated to the wireless telephone; and a third program code for forwarding the data in a format supported by the first browser, through the wireless data network, to the wireless telephone.

38. The computer readable medium as recited in claim 37, wherein the request comprises an identification identifying the wireless telephone; and the program code further comprises a fourth program code for verifying if the wireless telephone is authorized by comparing the identification with the account.

39. The computer readable medium as recited in claim 37, wherein the request comprises credential information; and the program code further comprises a fourth program code for verifying if the wireless telephone is authenticated by comparing the credential information with the account.

40. The computer readable medium as recited in claim 37, wherein the first browser is executed by a processor of the wireless telephone, and further wherein the processor controls a telephony function of the wireless telephone.

41. The computer readable medium as recited in claim 37, wherein the data includes a plurality of hyperlinks, each providing a link to a resource in the data network.

42. The computer readable medium as recited in claim 41, wherein if the request indicates one of the hyperlinks, the program code further comprises:

a fourth program code for retrieving information identified by the one of the hyperlinks from the data network.

43. The computer readable medium as recited in claim 37, wherein if the credential information is different from an existing credential information after the wireless telephone is authenticated, the program code further comprises a fourth program code for updating the account with the new credential information.

44. The computer readable medium as recited in claim 43, wherein the new credential information must be provided when the second browser executing on the computing device attempts to access the data.

45. The computer readable medium as recited in claim 44, wherein the format is in a first markup language supported by the first browser and the data is in a second markup language supported by the second browser.

46. The computer readable medium as recited in claim 45, wherein the second markup language provides a graphic user interface so that said data can be updated from the computing device.

47. A wireless telephone for accessing data in a data network system the wireless telephone comprising:

a display screen;

a memory containing a set of program code for a first browser;

a processor, coupled to the display screen and the memory, executing the set of program code to enable the first browser to perform operations of:

sending a request to retrieve the data from a wireless data network, the data being hosted in a server coupled between the wireless data network utilizing a first communication protocol and a data network utilizing a second communication protocol;

receiving the data presented in a first markup language;

displaying the data on the display screen; and wherein the data is accessible by a computing device operating a second browser and coupled to the data network, and wherein the data presented to the computing device is in a second markup language.

48. The wireless telephone as recited in claim 47, wherein the request comprises an identifier identifying the wireless telephone so that the wireless telephone can be authenticated by the server when the request is received.

49. The wireless telephone as recited in claim 47, wherein the first markup language and the second markup language are the same.

50. The wireless telephone as recited in claim 47, wherein the processor controls a telephony operation of the wireless telephone.

* * * * *